United States Patent
Krishna et al.

(10) Patent No.: US 11,863,407 B2
(45) Date of Patent: Jan. 2, 2024

(54) SYSTEM AND METHOD FOR EFFICIENT NUMERICAL DATA MODEL, MEMORY MANAGEMENT, STREAMING AGGREGATION AND CONTEXTUAL EVENT CHECKS IN LARGE SEMI-STRUCTURED DATASETS

(71) Applicant: Pelatro Pte. Ltd., Singapore (SG)

(72) Inventors: Arun Kumar Krishna, Bangalore (IN); Pramod Konandur Prabhakar, Bangalore (IN)

( * ) Notice: Subject to any disclaimer, the term of this patent is extended or adjusted under 35 U.S.C. 154(b) by 52 days.

(21) Appl. No.: 17/818,114

(22) Filed: Aug. 8, 2022

(65) Prior Publication Data
US 2023/0044674 A1  Feb. 9, 2023

Related U.S. Application Data

(60) Provisional application No. 63/230,263, filed on Aug. 6, 2021.

(51) Int. Cl.
*H04L 43/028* (2022.01)
*H04L 69/22* (2022.01)
*H04L 9/40* (2022.01)

(52) U.S. Cl.
CPC ........ *H04L 43/028* (2013.01); *H04L 63/0245* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 7,130,907 B2 | 10/2006 | Aitken et al. | |
| 7,263,537 B1 | 8/2007 | Lin et al. | |
| 7,526,514 B2 | 4/2009 | Chai et al. | |
| 7,822,868 B2 * | 10/2010 | Gassewitz | G06F 15/173 709/219 |
| 8,498,943 B2 | 7/2013 | Ogg | |
| 9,979,994 B2 | 5/2018 | Saretto et al. | |
| 10,082,979 B2 | 9/2018 | Hyde, II et al. | |
| 10,243,849 B2 * | 3/2019 | Bays | H04L 47/2441 |
| 10,698,882 B2 | 6/2020 | Parikh et al. | |

(Continued)

OTHER PUBLICATIONS

Geddes et al., "Algorithms for Computer Algebra", Kluwer Academic Publishers, Norwell, MA, USA, 1992, 304 pages.

(Continued)

*Primary Examiner* — James A Edwards
(74) *Attorney, Agent, or Firm* — Richard Piercy; Grell & Watson Patent Attorneys LLC

(57) ABSTRACT

A system for efficiently parsing semi-structured deep packet inspection traffic data tied to a telecommunications entity. The system is capable of parsing such records at million-records-per-second scale through use of a numerical data model, leverage on proven fundamental algebraic techniques, and shortcuts to label streaming traffic on the fly. In some embodiments, the system may perform parallel accumulation of data traffic into business grade counters using elementary techniques and subsequently identify subscribers exhibiting specific data patterns in real time for contextual targeting of promotional offers. A method of efficiently parsing the traffic data via the system of the disclosure.

20 Claims, 9 Drawing Sheets

(56) References Cited

U.S. PATENT DOCUMENTS

| | | |
|---|---|---|
| 11,366,859 B2* | 6/2022 | Stevens ................ G06F 40/237 |
| 2006/0184977 A1 | 8/2006 | Mueller et al. |
| 2011/0040734 A1 | 2/2011 | Andrade et al. |
| 2018/0285201 A1 | 10/2018 | Bangalore et al. |

OTHER PUBLICATIONS

Pappalardi, "A Survey on κ-Freeness", Dipartimento di Matematica, Universita' Roma Tre, Largo S. L. Muri-aldo 1, Roma, 00146—Italy, 22 pages.
Richards, "Algorithms for Factoring Square-Free Polynomials over Finite Fields" (Master's thesis), Aug. 7, 2009, Canada: Simon Fraser University, 30 pages.

* cited by examiner

SYSTEM AND METHOD FOR EFFICIENT NUMERICAL DATA MODEL, MEMORY MANAGEMENT, STREAMING AGGREGATION AND CONTEXTUAL EVENT CHECKS IN LARGE SEMI-STRUCTURED DATASETS

CROSS-REFERENCE TO RELATED APPLICATIONS

To the full extent permitted by law, the present United States Non-provisional Patent Application hereby claims priority to and the full benefit of, United States Provisional Application entitled "CAGE-EFFICIENT NUMERICAL DATA MODEL, MEMORY MANAGEMENT AND STREAMING AGGREGATION CUM EVENT CHECK TECHNIQUE FOR LARGE TELECOM GRADE SEMI STRUCTURED DATASETS FOR CONTEXTUAL TARGETING," having assigned Ser. No. 63/230,263, filed on Aug. 6, 2021, which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE DISCLOSURE

Technical Field of the Disclosure

The instant disclosure generally relates to electric digital data processing, namely methods or arrangements for processing data by operating upon the order or content of the data handled. More particularly, the instant disclosure relates to sorting, storage, and processing of high-volume incoming data into machine-readable algorithmic formats which can be quickly analyzed and acted upon.

The instant disclosure is not limited to any particular data type, business use, industry, operating system, or implementation.

Description of the Related Art

Most large businesses have a large volume of customers or subscribers. To accommodate the large volume of data associated with transactions related to their customers or subscribers, they may use one or more data stores sufficient to store a large volume of data concerning their customers or subscribers, their customers' or subscribers' activity or purchases, and other relevant data about their customers or subscribers. Additionally, these large companies also receive, send, process, analyze, report on, and otherwise handle large amounts of incoming and outgoing data. Day-to-day interactions and transactions may be recorded or collected, stored, processed, managed, or used to generate insights about the customers or subscribers, which may be acted upon to offer new opportunities for both the business and its customers. These data stores may often be repositories of information and data (i.e., databases) by which business and marketing operations may base their actions upon. Additionally, these data stores may be queried in order to find a particular customer or group of customers with one or more of a particular set of attributes. For instance, an accounts receivable department may need to obtain from its data store or data stores a list of subscribers whose invoice date falls on a particular day in the month and who have chosen to be automatically invoiced by credit card or ACH. In another instance, a marketing department may need to obtain from its data store a list of subscribers who have been a customer of the business for more than a specific number of years in order to reward those customers for their length of patronage. Additionally, automatic systems may be implemented to generate their own assessments of data, based on any number of criteria which may be important to the interaction of the business and its customers. In yet another instance, a marketing department in a wireless telecommunications company may wish to automatically identify particular classes or behaviors of subscriber sub-populations in order to increase its subscription or top-up revenue, thereby generating lists of customers for whom certain marketing offers may be highly relevant to those various specific classes or behaviors.

In general, such data may be stored and even analyzed using an Enterprise Resource Planning (ERP) system or platform. Over the years, ERP systems and platforms have evolved to either include or interface with various business platforms such as Customer Relationship Managers (CRMs), subscriber usage monitors, accounting software, distribution platforms, and business intelligence solutions. The data store and corresponding ERP system or platform may function as a transactional system, as online transaction processing databases, as an operational database management system, as a distributed database system offering similar functionality, and/or a combination of the like, whereby the transaction itself may be performed utilizing the ERP system or platform and the resulting data need not be stored on, recorded on, or otherwise copied to or from a separate a centralized data store. The data store and corresponding ERP system or platform may often but not always be stored in a relational database or table on a server connected to a network. Additionally, incoming data may be first stored in memory, the organization and transfer of which may be important to the speed at which automatic systems may store, analyze, report, and/or act upon incoming data.

When implemented in such a way, a central data store or distributed data stores from which the ERP system or platform operates may not receive, store, or be able to timely process relevant data in order to communicate business-relevant offers or alerts to its customers, such that by the time such an offer reaches its customer, it is already too late for the business or the customer to benefit. To address this concern, organizations may increase or improve the bandwidth, processing power, or other known technologies within their incoming data management and processing system. Obvious tradeoffs to such decisions exist and are known in the art to include expense of equipment and cost of powering and maintaining said equipment. Other means may be rule-based or AI-assisted data handling and/or indexing of incoming data in order to better organize data during storage such that it can be more quickly accessed later. However, certain data observations relevant to subscription use may only occur or be relevant in real-time or near-real-time such that by the time the data is stored, it may no longer be relevant to the business and/or subscriber. This is especially of concern because any data observation about subscribers which is acted upon late, may be considered wasteful, resource-wise. Often, instead of generating and distributing these offers based upon a datastore and analysis thereof, large companies processing large volumes of subscriber-related data may instead base these analyses upon data as it arrives.

One such method of handling incoming data quickly, upon receipt and/or incoming transmission, is Deep packet inspection (DPI). Often implemented as a means to restrict or monitor traffic for security purposes, DPI is an advanced method of examining and managing network traffic. It is a form of packet filtering that locates, identifies, classifies and reroutes or blocks packets with specific data or code payloads that conventional packet filtering, which examines only packet headers, cannot detect. Usually performed as part of a firewall defense, DPI functions at the application layer of the Open Systems Interconnection (OSI) reference model. Deep packet inspection examines the contents of packets passing through a given checkpoint and makes real-time decisions depending on what a packet contains and based on rules assigned by an enterprise, an internet service provider (ISP) or a network manager. Previous forms of packet filtering only looked at packet header information, which is analogous to reading an address printed on an envelope without any knowledge of the contents of the envelope. This was due partly to the limitations of older technology. Until recently, firewalls and other network security/management systems did not have the processing power necessary to perform deeper inspections on large volumes of traffic in real-time. Technological advancements have enabled DPI to perform more advanced inspections so that it can check both packet headers and data.

In some uses, DPI can examine the contents of a message and identify the specific application or service that sent it. In addition, filters can be programmed to look for and reroute network traffic from a specific Internet Protocol address range or a certain online service, such as FACEBOOK® or TWITTER®. However, rarely is DPI used to inspect business/subscriber-relevant data in order to determine business opportunities to increase the utility/relevance of the subscription to the subscriber and the profitability of the business.

The instant disclosure is designed to address at least some aspects of the problems discussed above. The system and method for efficient numerical data model, memory management, streaming aggregation and contextual event check in large semi-structured datasets described herein may be designed to replace or work alongside other various data processing systems, machines, computing devices, networks, the like and/or combinations thereof. Use of the system and method for efficient numerical data model, memory management, streaming aggregation and contextual event check in large semi-structured datasets described herein may help overcome many of the limitations of the systems and methods described above.

SUMMARY

Briefly described, in a possibly preferred embodiment, the present disclosure overcomes the above-mentioned disadvantages and meets the recognized need for such a system and method in order to efficiently parse semi-structured Deep Packet Inspection (DPI) traffic tied to an entity at million-records-per-second scale by using a numerical data model, leveraged on proven fundamental algebraic techniques and shortcuts to label streaming traffic on-the-fly, then perform parallel accumulation of data into business-grade counters using elementary techniques and subsequently identifying subscribers exhibiting specific data patterns in real-time for contextual targeting and marketing offers.

In order to describe a potentially preferred embodiment of the disclosed system and method, it may be helpful to simplify the system and method into a small subscriber set having a limited number of attributes, then applying this framework to a much larger set of subscribers having a much larger number of attributes may be more easily comprehended, as will be discussed in great detail in the Detailed Description. In summary, the disclosed system may include a numerical data model for semi-structured DPI data, fast tags on numerical records using basic algebraic and/or mathematic procedures, fixed-width counters, semi-flexible grains, business datatype aware pool-based memory management, and/or embedded rule-based event trip framework with sense check.

In one aspect, the disclosure may include a numerical data model for semi-structured DPI data. The numerical data model for semi structured Deep Packet Inspection data may be centered around a subscriber where every record may be parsed using algebraic techniques instead of conventional text processing techniques and may further be mapped to a fixed width 86-digit base 16 number.

In another aspect, the disclosure may include fast tags on numerical records. Fast tags on numerical records, according to the disclosure, may be computed using basic rules of divisibility which may then used for quick labelling of DPI traffic using modulo arithmetic followed by conventional look up. It may be appreciated by those skilled in the art that fast tags may be very useful as a shortcut for skipping/ignoring certain non-qualifying data and/or rules before even evaluating them, thereby avoiding waste in data processing and handling.

In another aspect, the disclosure may include fixed width counters. Specifically, Hour of the Day (HOD) and Hour to Day (HTD) counters may be preformatted with addressable data labels and accumulation bins into which streaming numerical records may be channelized en route while possibly being subjected to a label-accumulate-check-fire command pipeline.

In yet another aspect, the disclosure may include semi flexible grains. Specifically, the semi-flexible grains may be on and/or associated with preformatted HTD counters with an ability to choose any 3 grains for recent past aggregation from a master set of 12 grains that are factors of 60. The factors of 60 (1, 2, 3, 4, 5, 6, 10, 12, 15, 20, 30, and 60), may be chosen in order to associate different factors with different traffic types to align with business interests, in order to achieve the right balance between accuracy, speed, memory and computing resources required.

In a penultimate aspect, the disclosure may include a business datatype aware pool-based memory management. In this aspect, each pool of the business datatype aware pool-based memory management may include having allocation, coalesce, and compaction algorithms designed to be optimal considering the tenure and volatility of the respective pool, so as to adapt with varied demands on data retention and access in line with varied nature of data. By way of example and not limitation, this data or pools may include subscriber location, subscriber traffic type, previous pack/subscription purchases, the like and/or combinations thereof.

In a final aspect, the disclosure may include an embedded rule-based event trip framework with a sense check. The embedded rule-based event trip framework with sense check may be understood by those having skill in the art to suppress trivial repeat violations of the same rule so as to not choke or otherwise bottleneck other downstream components in the larger network of systems where not all modules can handle million-records-per-second scale of data.

By implementing the above systems, methods, and processes in high-scale data receipt environments, many benefits may be achieved as will be recognized by those skilled in the art. One benefit of the present disclosure may be its ability to parse and label semi-structured telecom (or otherwise) grade datasets at the scale of one million records per second using minimal resources owing to leverage of numerical data models and algebraic techniques. Additional benefits may be achieved by accumulating DPI streaming data into business relevant bins based on labelled traffic types in real time, thus making the whole information more useful for subsequent business analysis. Furthermore, the ability to support real time decisioning rules by organizing labelled counters into time aware bins such as "Last 1 minute", "Last 2 minutes", "Last 5 minutes", etc. thus enabling usage of trend-based functions in real time may offer further benefits. A subscriber centric co-located data organization for volatile and less volatile data with varying demands on tenure that arrive at different points in time thus enabling business rules to target audience using aggregation on streaming traffic alongside metrics like recent location history, recent purchases and recent engagement trail may be included to offer similar benefits at scale. Another benefit of the present disclosure may be its holistic packaging of many trivial and proven techniques spanning across parsing, labelling, aggregation and event trip with sense check, into an integrated module for realizing a tangible business case like contextual targeting on streaming data at scale to obtain a highly implementable toolkit for data handling at massive scale.

When implemented, the benefits to a business implementing the disclosed system and method for efficient numerical data model, memory management, streaming aggregation and contextual event check in large semi-structured datasets may include but are not limited to efficient data processing, reduction in time to make observations and/or assessments of subscriber-relevant data, increased subscriber acceptance of marketing offers, greater applicability and relevance of such observations/assessments, decreased operating costs, and increased revenue/profit.

These and other features of the disclosed system and method will become more apparent to one skilled in the art from the prior Summary, and following Brief Description of the Drawings, Detailed Description, and Claims when read in light of the accompanying Detailed Drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which.

Figure 1:
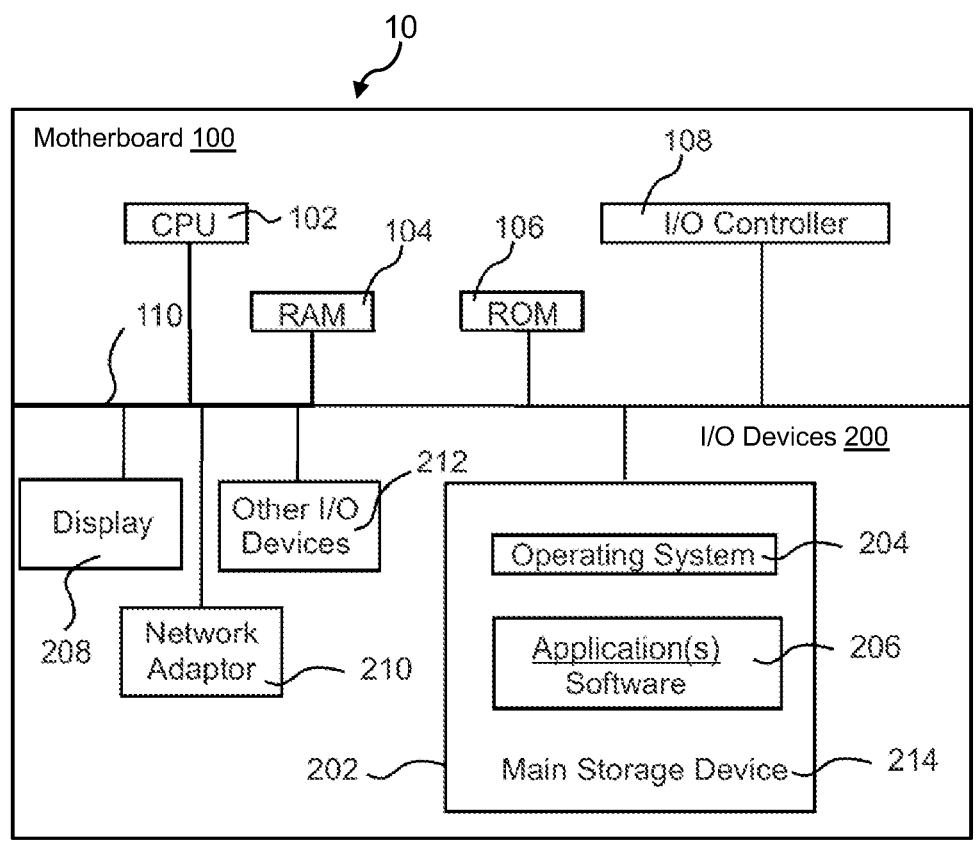
FIG. 1 is a block diagram of a computer system of the present disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1-9, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples.

In order to understand the present disclosure, certain variables need to be defined.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices, solid-state drives (SSDs) and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object-oriented programming languages, and other conventional programming language may be utilized without departing from the spirit and intent of the present disclosure.

Referring now to FIG. 1, there is illustrated a block diagram of a computer system 10 that provides a suitable environment for implementing embodiments of the present disclosure. The computer architecture shown in FIG. 1 is divided into two parts—motherboard 100 and the input/output (I/O) devices 200. Motherboard 100 preferably includes subsystems or processor to execute instructions such as central processing unit (CPU) 102, a memory device, such as random access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computer system 10 further preferably includes I/O devices 202, such as main storage device 214 for storing operating system 204 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1 to be present to practice the present disclosure, as discussed below. Furthermore, the devices and subsystems may be interconnected in different configurations from that shown in FIG. 1, or may be based on optical or gate arrays, or some combination of these elements that is capable of responding to and executing instructions or operations. The operation of a computer system such as that shown in FIG. 1 is readily known in the art and is not discussed in further detail in this application, so as not to overcomplicate the present discussion.

Figure 2:
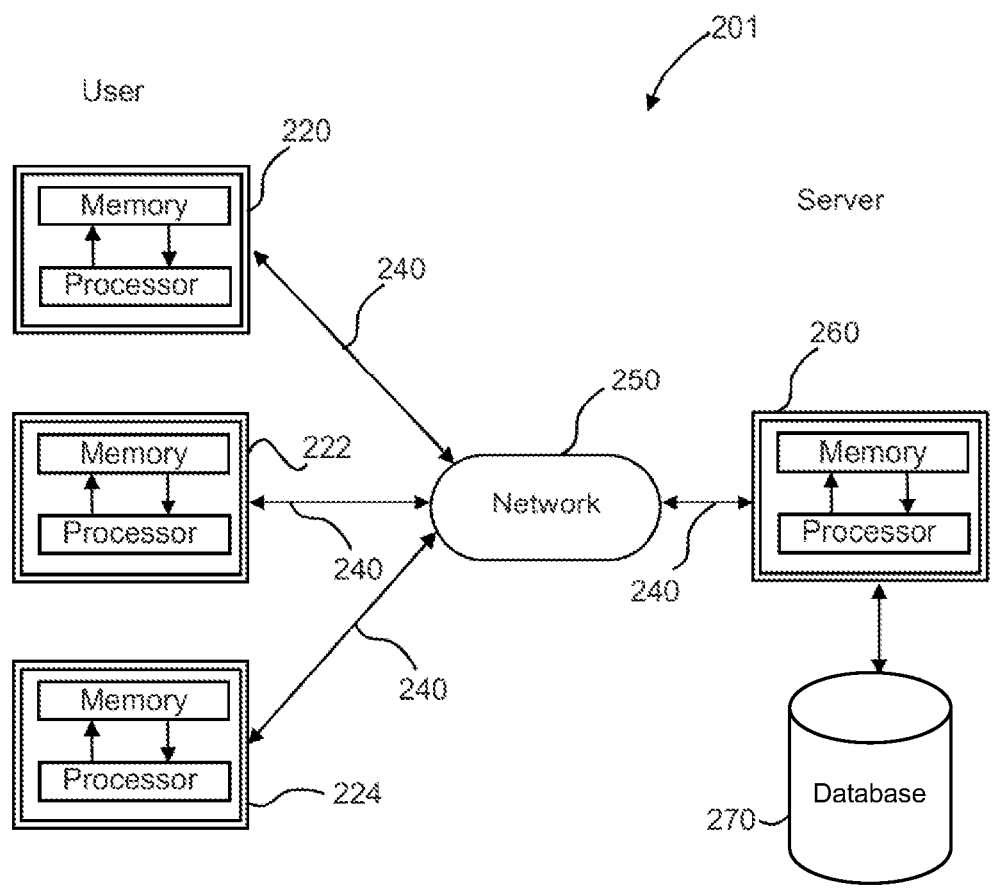
FIG. 2 is a block diagram of a communications system implemented by the computer system in FIG. 1.

Referring now to FIG. 2, there is illustrated a diagram depicting an exemplary communication system 201 in which concepts consistent with the present disclosure may be implemented. Examples of each element within the communication system 201 of FIG. 2 are broadly described above with respect to FIG. 1. In particular, the server system 260 and user system 220 have attributes similar to computer system 10 of FIG. 1 and illustrate one possible implementation of computer system 10. Communication system 201 preferably includes one or more user systems 220, 222, 224, one or more server system 260, and network 250, which could be, for example, the Internet, public network, private network or cloud. User systems 220-224 each preferably include a computer-readable medium, such as random-access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random-access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communication system 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, print and/or view multidimensional digital master image(s) 303 (see FIG. 3). Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s) 303. The communications link 240 may include, for example, a wired, wireless, cable, optical or satellite communication system or other pathways.

It is contemplated herein that RAM 104, main storage device 214, and database 270 may be referred to herein as storage device(s) or memory device(s).

Figure 3:
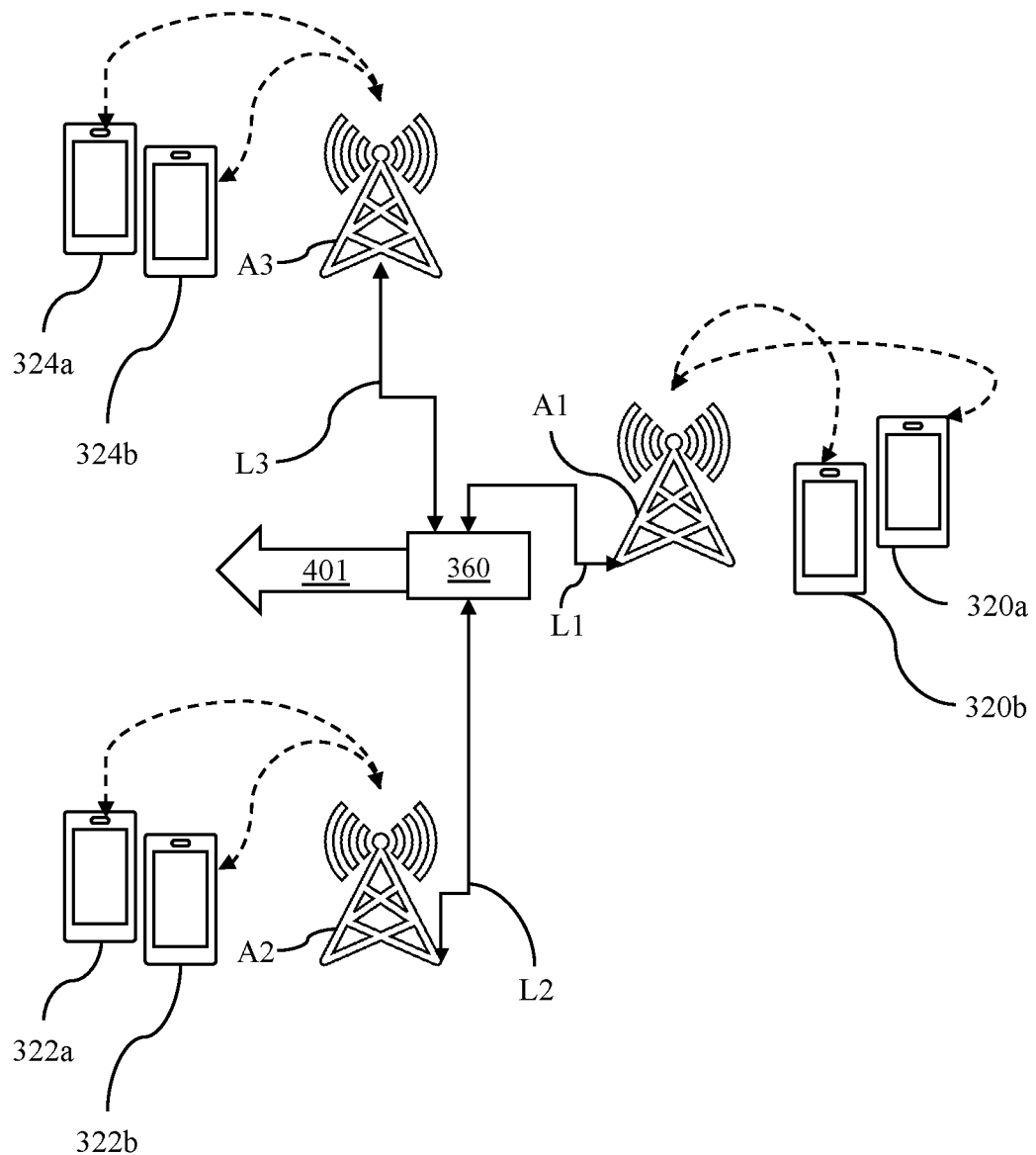
FIG. 3 is a block diagram illustrating various subscriber devices within an exemplary telecom network.

Referring again now FIG. 3, by way of example, and not limitation, therein is illustrated various subscriber handsets within a telecom network, simplified to better illustrate and describe the activities thereof. Starting at the righthand side, subscriber devices 320a, 320b may be closest to or otherwise coordinated to receive and transmit data wirelessly to and from antenna A1. Clockwise, subscriber devices 322a, 322b may be closest to or otherwise coordinated to receive and transmit data wirelessly to and from antenna A2. Finally, subscriber devices 324a, 324b may be closest to or otherwise coordinated to receive and transmit data wirelessly to and from antenna A3. As may be noted and observed by those skilled in the art of telecom infrastructure design and implementation, each of subscriber devices 320a-b, 322a-b, and 324a-b are representative only and may in fact represent hundreds, thousands, or millions of subscriber devices, each connected to various antennas throughout a mobile telecommunications infrastructure. From each of antenna A1, antenna A2, and Antenna A3 may be telecommunications lines L1, L2, and L3, respectively, which may reach telecom computing machine 360 for receipt and intake/storage/processing by the company using its human and machine infrastructure. Also clear to those having ordinary skill in the art, such telecom computing machine 360 may represent one machine or, more likely, many machines at one or more locations. Furthermore, such a telecom computing machine 360 may be implemented in a cloud computing or distributive environment. Subsequent to receipt, data from each subscriber may arrive simultaneously or in quick succession as incoming data stream 401. Further processing of incoming data is described below.

Having described the basics of the structure and function of example methods of computing, networks, and mobile telecommunications, incoming data stream 401, and the exemplary methods and systems for use of incoming data stream 401 may be further illustrated and described below.

Figure 4:
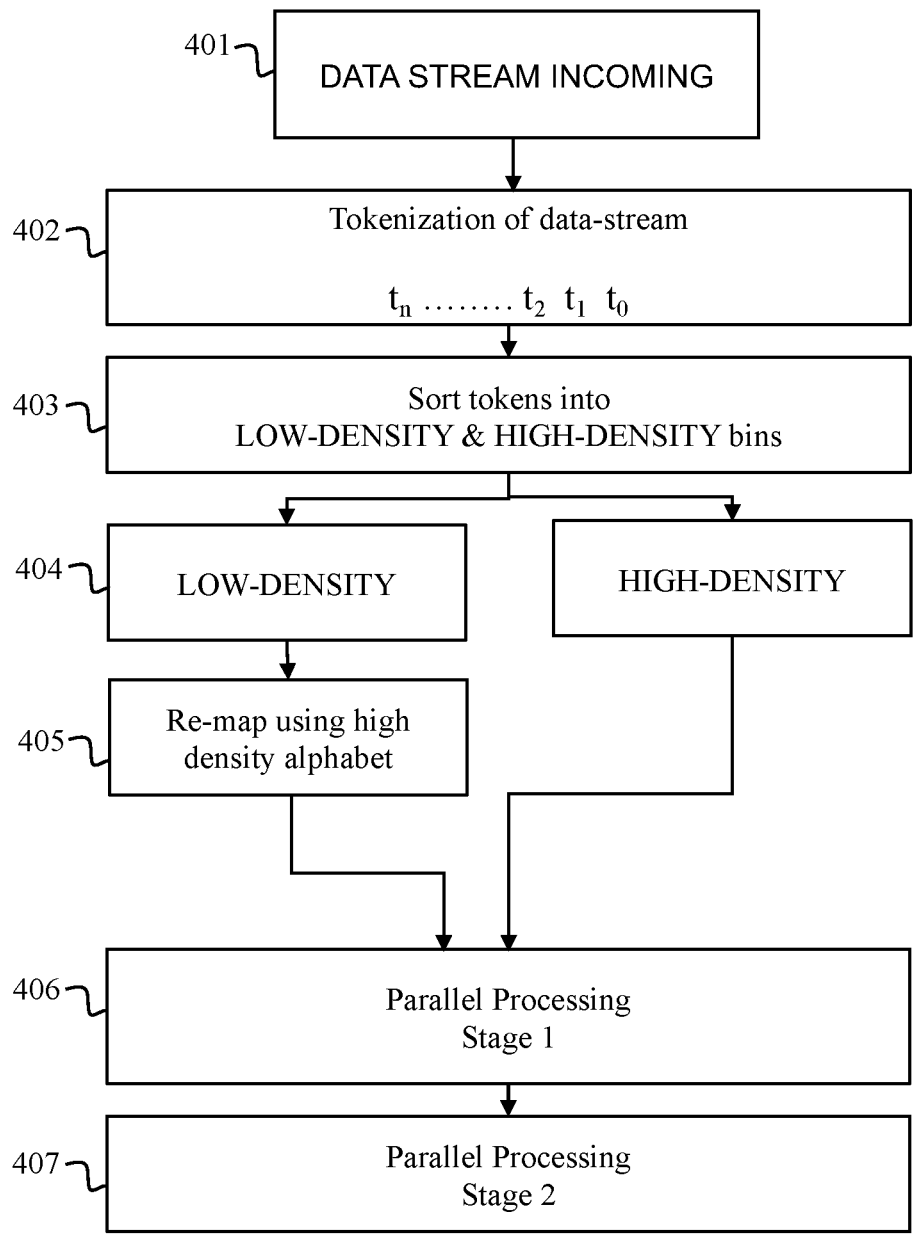
FIG. 4 is a flowchart showing the disclosed method steps of initial incoming data receipt/handling/processing.

Starting at FIG. 4, illustrated therein and described herein is a flowchart showing the disclosed method steps of initial incoming data receipt/handling/processing. Starting at incoming data stream 401, large scale data may be arriving at a machine within a system of the disclosure as herein described. In a potentially preferred embodiment of the systems and methods of the disclosure, incoming data stream 401 may be an 8-bit octet encoded character stream where every character consumes 1-byte space. For many fields, including fields by way of example and not limitation: Mobile Station Integrated Services Digital Network (MSISDN), other device identifiers, duration, Internet Protocol (IP) Address, the like and/or combinations thereof, some, part, or all of the character strings may be wasted space if the purpose of storing/processing this information is to quickly act upon observations about incoming data stream 401. Therefore, some, part, or all of those character strings may be truncated, ignored, or otherwise disposed of prior to data stream tokenization step 402. At data stream tokenization step 402, the incoming data stream 401 may be tokenized into this 8-byte octet encoded character stream and subsequently divided into low density and high density at sorting step 403. Having tokenized the incoming data stream 401 into an 8-byte octet encoded character stream, a master list of field-legal values may be developed and compiled such that common values may appear on a master list, but less common and/or unique values or value sets for fields may not. While any threshold for density may be chosen, in a potentially preferred embodiment, 25% may be chosen as a threshold. If a given token has 25% of values or less which appear on a compiled master list, that token may be considered "Low-Density" and separated from "High-Density" tokens, or those having more than 25% of characters from the master list. At sorting step 403, High-Density tokens may be sorted into High-Density bins and Low-Density tokens may be sorted into Low-Density bins. At re-mapping step 404, Low-Density tokens may be assigned a new alphabet (a master list of symbols), in line with field-legal characters and my then be encoded using as many bits that are necessary for full encoding. By way of example and not limitation, an alphabet comprising [0, 1, 2, 3, 4, 5, 6, 7, 8, 9, . . . ] may be used for a Low-Density field, such as IP addresses, and it may be encoded using 4-bits per character instead of the default 8-bits from the incoming data stream 401. Since direct mapping may take far less time than performing lookups may consume, the record building may work as a pipeline where the next record is picked for direct mapping even when it contains fields which are being looked upon for the current record. Then, turning to parallel processing first stage 406, an asynchronous parallel pipeline may facilitate low-latency turnover for records entering the stream. Records which have all their sections mapped may be pushed or steered ahead to the next stage and those that do not have all their sections mapped, for whatever reason, may be suspended or set aside to "make way" for those that do. By handling in such a way, tardiness or lateness of decision-making may be reduced in likelihood. Then at parallel processing second stage 407, other techniques may be employed which may be best described as "inertia boosting"—that is keeping fast processes fast, and making them faster, and keeping slow processes slow and perhaps even slowing them to make way for the faster processes. The systems and methods of the disclosure at this step may push ahead those records or records types that are being parsed sooner than others such that they arrive sooner in the parallel pipeline. This may be accomplished incrementally. While computing algorithms may have average and best core times deduced under asymptotic analyses, each individual entry may still end up consuming a different time. That may be true of any tree-based/non-uniform hash-based construct. The systems and methods of the disclosure, instead do not attempt to equalize or otherwise force data processing to be accomplished at a steady or even pace, but rather push ahead those capable of completing very quickly to achieve the greatest speed for processing those records. Those which consume, or are observed to consume, greater time and resources are pushed behind. This enables fast-processing records to finish even quicker in order to enable further decision-making to be based on those that can be processed very quickly. The reason may be that with time-sensitive data and decision-making thereof, a late or delayed processing may be equivalent to not processing whatsoever, and the resources may therefore be wasted on such tasks. Further details and benefits of the disclosed system and method will be recognized by those having ordinary skill in the art following additional review of the remaining Drawings and related Detailed Description below.

Figure 5:
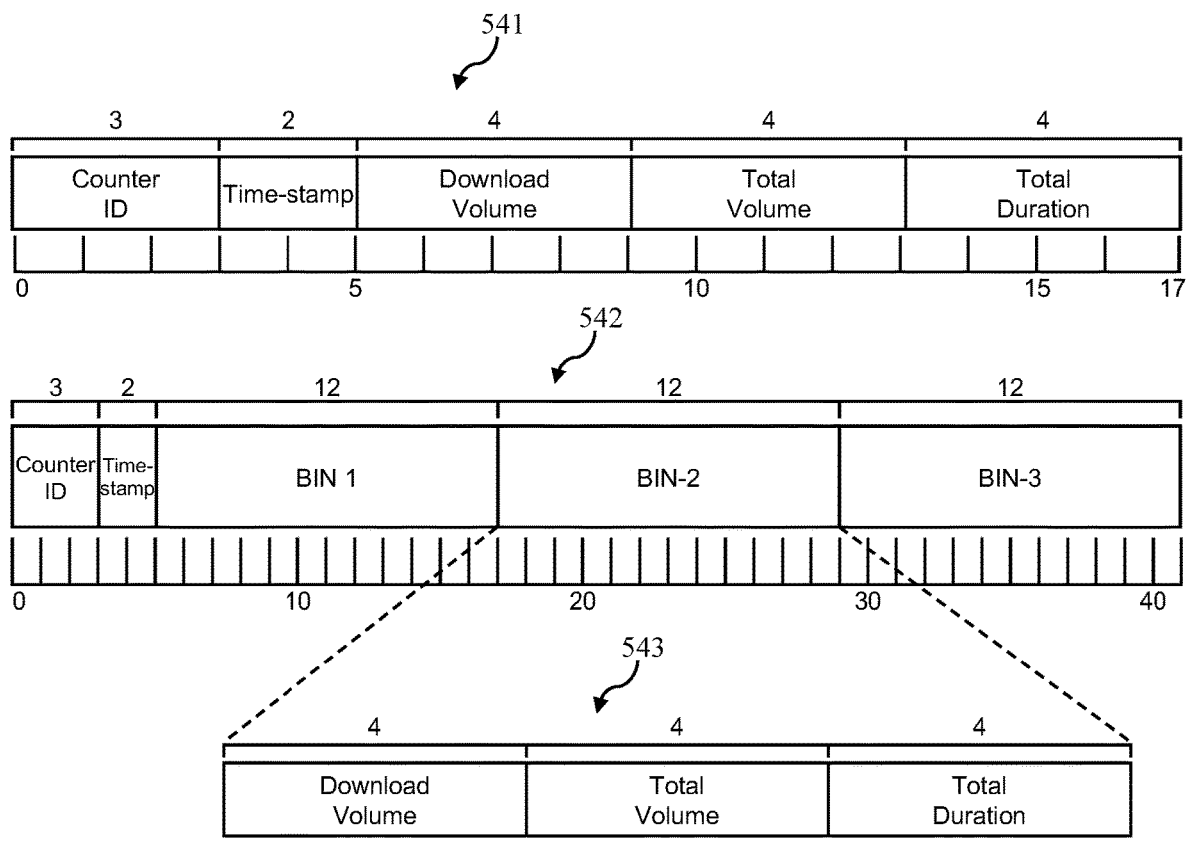
FIG. 5 is a block diagram illustrating an exemplary physical memory unit.

Turning now to FIG. 5, illustrated therein is a block diagram illustrating an exemplary physical memory unit of the disclosure. Starting at HTD memory unit 541, a pre-formatted memory layout with optimal data diversity is illustrated thereon. A block or HTD memory unit 541 may be related to a particular subscriber and may contain a self-organizing sequence of Hour to Day (HTD) and Hour of the Day (HOD) counters. Each HTD counter may be observed at the front of HTD memory unit 541 and HTD memory unit 541 may be exactly 17 bytes wide. As illustrated by way of example and not limitation, the HTD counter ID may consume 3 bytes, a timestamp may consume 2 bytes, a download volume may consume 4 bytes, total volume may consume 4 bytes, and total duration may consume 4 bytes for a total of exactly 17 bytes for the HTD memory unit 541. Each HOD counter may further precede or appear at the front of each HOD memory unit 542 and HOD memory unit 542 may be exactly 41 bytes wide. Within HOD memory unit 542, as illustrated therein FIG. 5 by way of example and not limitation, HOD counter ID may consume 3 bytes, a timestamp may consume 2 bytes, a first bin may consume 12 bytes, a second bin may consume 12 bytes, and a third bin may consume 12 bytes, for a total of exactly 41 bytes. As may be understood by those having ordinary skill in the art, one or more bins as illustrated therein FIG. 5 as second HOD bin 543 may be sub-divided into, by way of example and not limitation, download volume consuming 4 bytes, total volume consuming 4 bytes, and total duration consuming 4 bytes. It may be further observable to those having ordinary skill in the art that HTD memory unit 541 may be organized similarly or identically to exemplary second HOD bin 543 such that each have 3 4-byte sections containing download volume, total volume, and total duration. In use, free space tracking may be done efficiently without using any additional bits or flags, given this pre-formatted arrangement for HTD memory unit 541 and HOD memory unit 542. For instance, if Counter ID for any of HTD memory unit 541 or HOD memory unit 542 equals zero (0), it may be assumed to be free space. Contrarily, if Counter ID for any of HTD memory unit 541 or HOD memory unit 542 equals any non-zero number or character, said respective memory unit may be assumed to be occupied. This way HTD memory unit 541 and HOD memory unit 542 memory marking may proceed smoothly, and without using additional bits and/or flags, but rather instead relying on solely bitwise operators and equality comparison. In practice or in a preferred embodiment of the disclosed system, a record parsing phase may occur upon receipt of incoming data stream 401 where the entire stream of bytes representing one record is captured as an 86-digit number with certain digits in lower words mapped directly from incoming records and many digits in upper words are deduced in parallel as they involve look-up and additional computation, as illustrated in FIG. 4. Then, weight assignment strategy may be implemented for category and sub-category domain values. Prime numbers may be assigned to category values and sub-category line items under a particular category may be assigned square-free numbers, which may be a product of main category weight, and another prime number as a local-weight. By using such a schema, each subcategory weight may have exactly 4 factors including, for instance: 1, itself, category weight, and the local weight. Within each HTD memory unit 541 and each HOD memory unit 542 which consume 17-bytes and 41-bytes, respectively, each counter may capture accumulated internet data traffic statistics for a particular kind of traffic determined by the counter ID. The details may be captured into bins of 3 cells, as herein illustrated, each where the cells contain metrics, such as download volume, total volume, and total duration. These may each be normalized to meaningful business values, such as megabytes for download and total volume and seconds for total duration. HTD memory unit 541, in a potentially preferred embodiment of the disclosure, may store traffic statistics since midnight of the current day until the current time and HOD memory unit 542, in such an embodiment, may store traffic statistics since the beginning of the current hour until the present moment in time. For organization optimization and access optimization purposes, each HOD memory unit 542 may possess, as illustrated herein, and capture incoming data stream 401 into these 3 bins (e.g., download volume, total volume, and total duration), similar to the HTD memory unit 541, but may represent three subunits of time in minutes, each subunit being a factor of 60. For example and not limitation, one such bin in HOD memory unit 542 may represent cumulative traffic statistics for the preceding 2 minutes, while the other two bins may represent cumulative statistics for the preceding 12 minutes and preceding 20 minutes, respectively. Then, each HOD memory unit 542 for the 3 bins or subunits may capture from a total possible 12 factors of the number 60 (i.e., for each minute of the hour), 1 minute, 2 minutes, 3 minutes, 4 minutes, 5 minutes, 6 minutes, 10 minutes, 12 minutes, 15 minutes, 20 minutes, 30 minutes, and 60 minutes (each being a minutes-factor of an hour, or 60 minutes). Then the assigned weights may be included within the counter ID as described above. By way of example and not limitation, one such bin in HTD memory unit 541, a corresponding counter ID with, for example, 38 for a date/time, such as May 20, 2021 at 17:29 may capture accumulated download megabytes, upload megabytes and total duration spent browsing, for instance FACEBOOK® by an individual subscriber between 00:00 of that day and 17:29 that day. Business rules may then be applied to any given data set on any given HTD memory unit 541 and/or HOD memory unit 542. For instance, a business may be very interested in the overall consumption of health and fitness browsing time based upon a hypothetical promotion. Then a rule may be desired within the system of the disclosure such that if such browsing time exceeds 18 minutes and/or 500 MB, as an example, an alert is made to the business and/or the subscriber. Even in examples where several hundred HTD memory units 541 and/or HOD memory units 542 exist for a given subscriber, a rule evaluation may complete a simple single pass through all counter IDs and filter only those which have counter IDs which yield no remainder when divided by the derived rule divisor obtained using numerical functions such as product, greatest common divisor (GCD), least common multiple (LCM), other simple numerical functions, the like and/or combinations thereof on individual category weights. Additionally, it may be a feature or important benefit of the disclosure that counter IDs on any given HTD memory unit 541 and/or HOD memory unit 542 retain their traits even when being continually merged with other counter types, using algebraic and arithmetic characteristics. By using prime numbers and square-free numbers may yield an unambiguous scheme for determining the behavior profile of an individual despite retaining only the aggregated counter numbers, as may be more easily understood with a thorough understanding of the above and below. Put simply, a ratio of powers of prime factors may be indicative of ratios of the underlying traffic types. Thus, for highly specific business queries or analyses, it may not be necessary to complete prime factorization, but instead repeated division by a prime number representing the desired traits for as long as the number is no longer cleanly divisible (i.e., having no non-integer remainder) may be sufficient to obtain the power, which may be valuable when output into the business CRM system.

Then, as it may be better understood by those having ordinary skill in the art, an example of a simplified system of the disclosure as described herein may be useful to further understanding of prime and square-free number weight assignment, its exemplary methods, and its benefits. In such a simplified embodiment categories of user activities may be assigned prime number weights. For instance, by way of example and not limitation, Social Media might be assigned 2, Gaming might be assigned 3, Health might be assigned 5, Lifestyle might be assigned 7, Fitness might be assigned 11, and so on. Then specific activity within each category may be assigned square-free numbers. In this simplified example, YouTube® might be classified as Social Media and be assigned 17, FACEBOOK® might be classified similarly and receive a 19 assignment, and WhatsApp® might be similarly classified and receive a 23 assignment. The product of each may be important to later processing, which would be 2 times the square-free number selected. In this example, that may be 34 for YouTube®, 38 for FACEBOOK®, and 46 for WhatsApp®. Essentially, these prime numbers, which may be assigned to category values, and these square-free which may be assigned to sub-category line items under a particular category, may be multiplied to form what may be understood herein as a local-weight. Using such a scheme/schema may guarantee that each of the subcategory weights have exactly 4 prime factors–1, itself, category weight and the local-weight, which may prove useful for later accessing/processing.

Turning to understanding such later accessing/processing, as it may be useful in many business queries, divisibility and prime factorization may be utilized to develop various understandings, processes, and observations as to users and their data, which may be accomplished at much greater speeds across much more voluminous data, thanks to the method of assembly/storage of incoming data stream 401. Using the example above, where various categories and specific subcategories were chosen to obtain various local-weights, divisibility and prime factorization and their respective utility may be better understood using this simplified example. Using an example where Fitness received 11 and Lifestyle received 7 (the product of which would be 77) and the WhatsApp® subcategory received a 46 local-weight, those may be multiplied and stored according to the systems and methods of the disclosure. If further activity, such as FACEBOOK® having the local-weight of 38 were then appended, the total product across all such activity may be 134,596, which is factorized to $2^2 \times 7 \times 11 \times 23 \times 19$. Note, that 2 is raised to a power of 2 because two user activity categories fall under Social Media (WhatsApp® and FACE-BOOK®). Then if a business wanted to determine, who among its subscribers use social media and fitness at a ratio of 2:1, this could easily be obtained and match such a user to such a query. Those having ordinary skill in the art may understand that counters may retain their traits or underlying "essence" of traffic types even when they continue to be merged with other counter types. By choosing weights using prime numbers and square free numbers as described herein may yield an unambiguous scheme/schema of determining the behavioral profile of an individual despite retaining only the aggregated counter numbers (or their products). Ratio of powers of prime factors may then be indicative of ratio of underlying traffic types. For pointed business queries, it may not be necessary to do complete prime factorization, instead, repeated division by the prime number representing the desired traits for as long as the number is divisible without a reminder is sufficient to get the power. Since computing systems can complete such mathematical procedures without significant resource expenditure, such a scheme/schema allows for basic computing mathematics to not only save on processing/storing incoming data stream 401, but also receive a significant benefit when performing business relevant queries upon such data at limited resource expenditure. Given this method of organization of incoming data stream 401, including those described and illustrated therein FIG. 5, as it relates to pre-formatting of said incoming data stream 401, further details and benefits of the disclosed system and method will be recognized by those having ordinary skill in the art following additional review of the remaining Drawings and related Detailed Description below.

Figure 6:
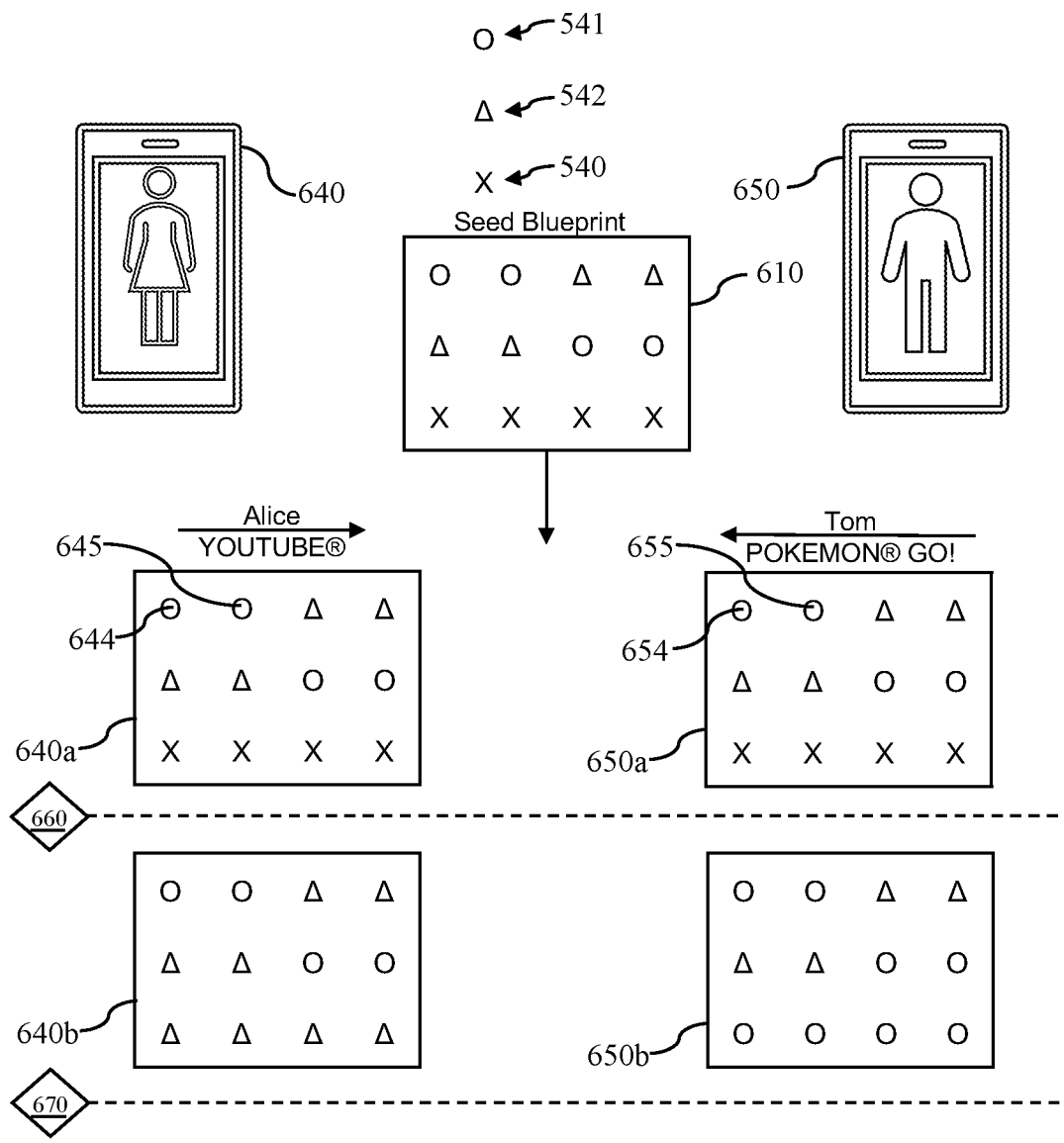
FIG. 6 is a block diagram illustrating a simplified exemplary efficient incoming data management/parsing.

Turning to FIG. 6, illustrated therein is a block diagram illustrating a simplified exemplary efficient incoming data management/parsing. Given the pre-formatted and self-organizing principles described above, the memory layout may be further optimized according to the principles illustrated in FIG. 6 and described herein. A legend has been provided such that a "O" may denote HTD memory unit 541, a "A" may denote HOD memory unit 542 (each described in detail in FIG. 5), and an "X" may denote unformatted memory unit 540. In a potentially preferred embodiment, actual positioning of counters and their related memory units may be based on the most common traffic-type, behavioral profiles, and/or the like. An example seed blueprint 610 is illustrated thereon FIG. 6, which may indicate two HTD counters, two HOD counters, another two HTD counters, another two HOD counters, followed by four unformatted regions. Example profiles of Alice 640*a* and Tom 650*b* are further provided having a similar layout. One example, initial Alice 640*a*, may be a subscriber having HTD YOUTUBE® counter 644, followed by HTD social media counter 645, and then followed by other HOD counters, HTD counters, and unformatted counters. Another example, initial Tom 640*a*, may be a subscriber having HTD POKEMON® counter 654, followed by HTD gaming counter 655, and then followed by other HOD counters, HTD counters, and unformatted counters. As will be observed by those having ordinary skill in the art, each blueprint may be initially only partially consumed, such that several unformatted memory units 540 may be present, then at fact-based assignment step 660, these may be formatted if a given expectation, based on any variety of factors, indicates that upcoming arriving data from incoming data stream 401 and associated with either Alice 640 or Tom 650 may be of HOD or HTD. Then, fact-based processed Alice may be assigned HOD memory unit 542 at each unformatted memory unit 540 and Tom may be assigned HTD memory unit 541 for each unformatted memory unit 540. Additionally, various HTD memory unit 541 and HOD memory unit 542 may be assigned as a given traffic type, using predictive algorithmic techniques based on previous user behavior, such that when a future incoming data stream 401, and the data associated therewith, may be associated with either Alice 640 or Tom 650 may be pre-assigned into those memory units without further machine effort dedicated toward assigning traffic types. Then, at deduction step 670, further deductions may occur. In this example, both Alice 640 and Tom 650 may begin with the same seed blueprint 610. If, in this non-limiting example, the first record for Alice 640 is Alice YOUTUBE® 640*a* and for Tom 640 is Tom POKEMON® 650*b*, Alice 640 may be known to be currently browsing YOUTUBE® and streaming video thereof that service and Tom 640 may be known to be currently playing POKEMON® on his mobile device, each mobile device connected to a mobile telecommunications network. Such knowledge may be obtained via said mobile telecommunications data network and received as incoming data stream 401. Given the known data consumption behavior of Alice 640 and Tom 650, then each may having the same seed blueprint 610, the first counters may occupy respective traffic types. Counters towards the head may be more efficient for read and write as bytes after that may be simply skipped and not parsed. Given these initial steps, a persona for users may be generated such that these advantages inherent in memory allocation may be leveraged to increase the speed at which later observations may be made, such as pre-allocation and/or pre-determination of unformatted memory units 540 into formatted spaces, based on for instance, persona categories. Further details and benefits of such a self-organization and preformatting system and method will be recognized by those having ordinary skill in the art following additional review of the remaining Drawings and related Detailed Description below.

Figure 7:
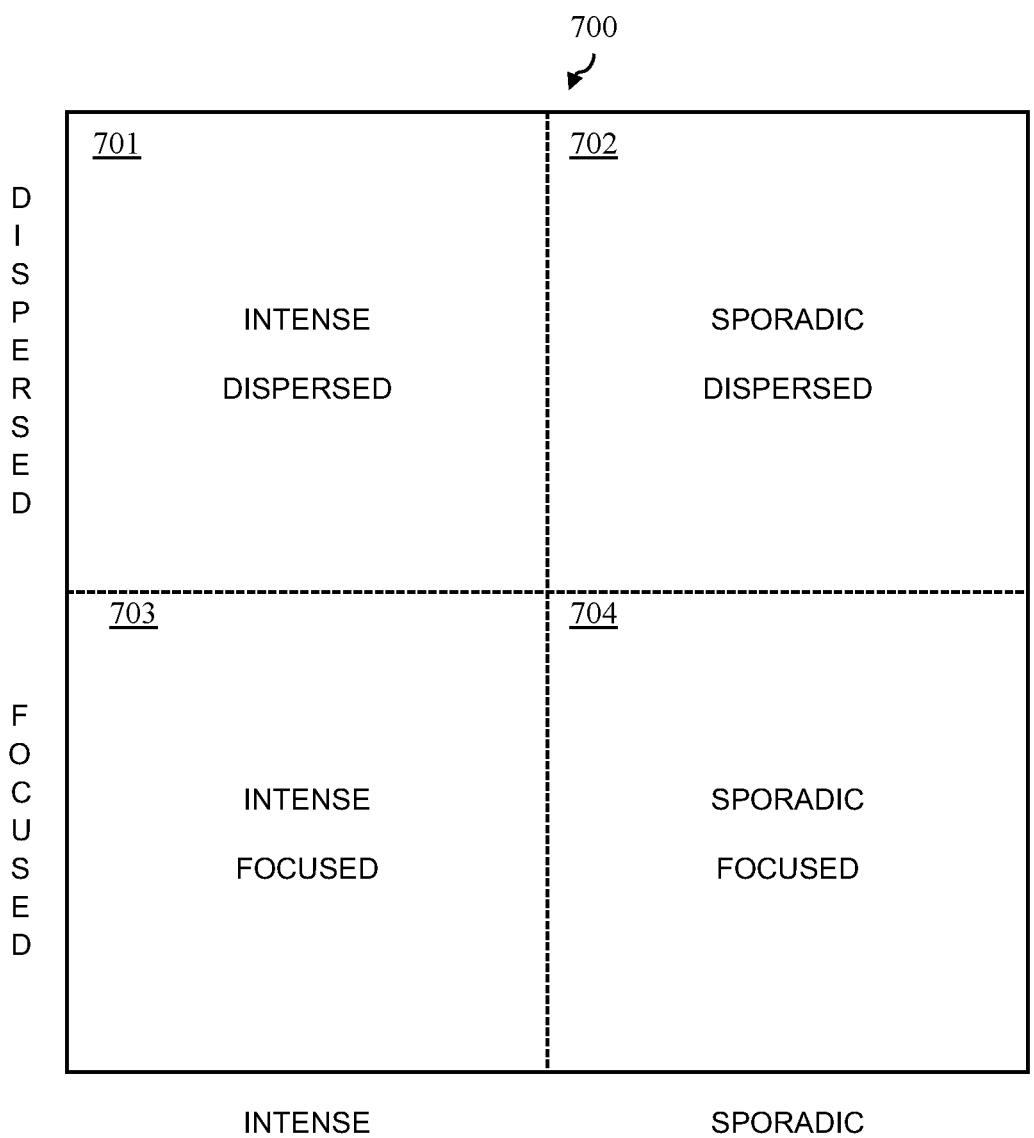
FIG. 7 is a block diagram illustrating a proposed exemplary subscriber classification mechanism.

Turning now to FIG. 7, therein illustrated and herein described may be a block diagram illustrating a proposed exemplary subscriber classification mechanism. Hypothetical persona matrix 700 is used herein as an exemplary method of determining a persona for a mobile telecommunications data user in order to implement the systems and methods of the disclosure. Hypothetical persona matrix 700 may comprise observations of users, based on observed behaviors during a user's interaction(s) with the mobile telecommunications infrastructure as incoming data stream 401. By way of example and not limitation, these may include the opposite pairs of dispersed behavior versus focused behavior and intense behavior versus sporadic behavior. Then, these behaviors may each be determined, based on the user activity, and assigned into one of intense/dispersed behavior category (ID) 701, sporadic/dispersed behavior category (SD) 702, intense/focused behavior category (IF) 703, and finally sporadic/focused behavior category (SF) 704. In total these may comprise four (4) total personas within the hypothetical persona matrix 700 such that any particular user may, for at least a period of time, be classified into one category. In such an organization of hypothetical persona matrix 700, beginning with intense behavior, those users assigned that behavior category may include those users who use the internet in dedicated chunks of time, and when they do so, they routinely use it for approximately an hour. Consumption of data may occur during specific times during the day, but may not consistently consume data throughout the day. If one were to chart an intense behavior user's data consumption throughout the day, one may observe periods of great data consumption and periods having none or very little. A sporadic behavior may include internet users who may consume a more consistent amount of data throughout the day, but do so in smaller time-period "chunks", such that the consumption chart may reflect smaller and narrower peaks, but with a more consistent amount of consumption on average throughout a given day. A focused behavior may include users who may consume data in one or few ways (e.g., games, music streaming, etc.) and a dispersed behavior may include user who may consume data in more varying ways throughout a given day. As it relates to the systems and methods of the disclosure, intense behavior users may need fewer HOD counters but benefit from more fine-grained HOD counters. Sporadic behavior users instead may need more HOD counters and benefit from coarse grains. By implementing the above system in order to establish various seed blueprints 610 as provided herein, the personas of IF 701, SF 702, ID 703, and SD 704 may each have their own of four pre-designed seed blueprints 610 based on these various traits and the seed blueprint 610 may in fact change based on behavioral changes. Furthermore, it may be observed by those having ordinary skill in the art that users with focused behavior may benefit from having many related traffic-types placed in close proximity of each other while users having sporadic behavior may benefit from having the top-traffic-type toward the head of HTD memory unit 541. Now, having characterized an exemplary hypothetical persona matrix 700, the processes by which such a persona may be processed and handled within HTD memory units 541 and HOD memory units 541 may be understood by those having ordinary skill in the art through review of the remaining Drawings and related Detailed Description below.

Figure 8:
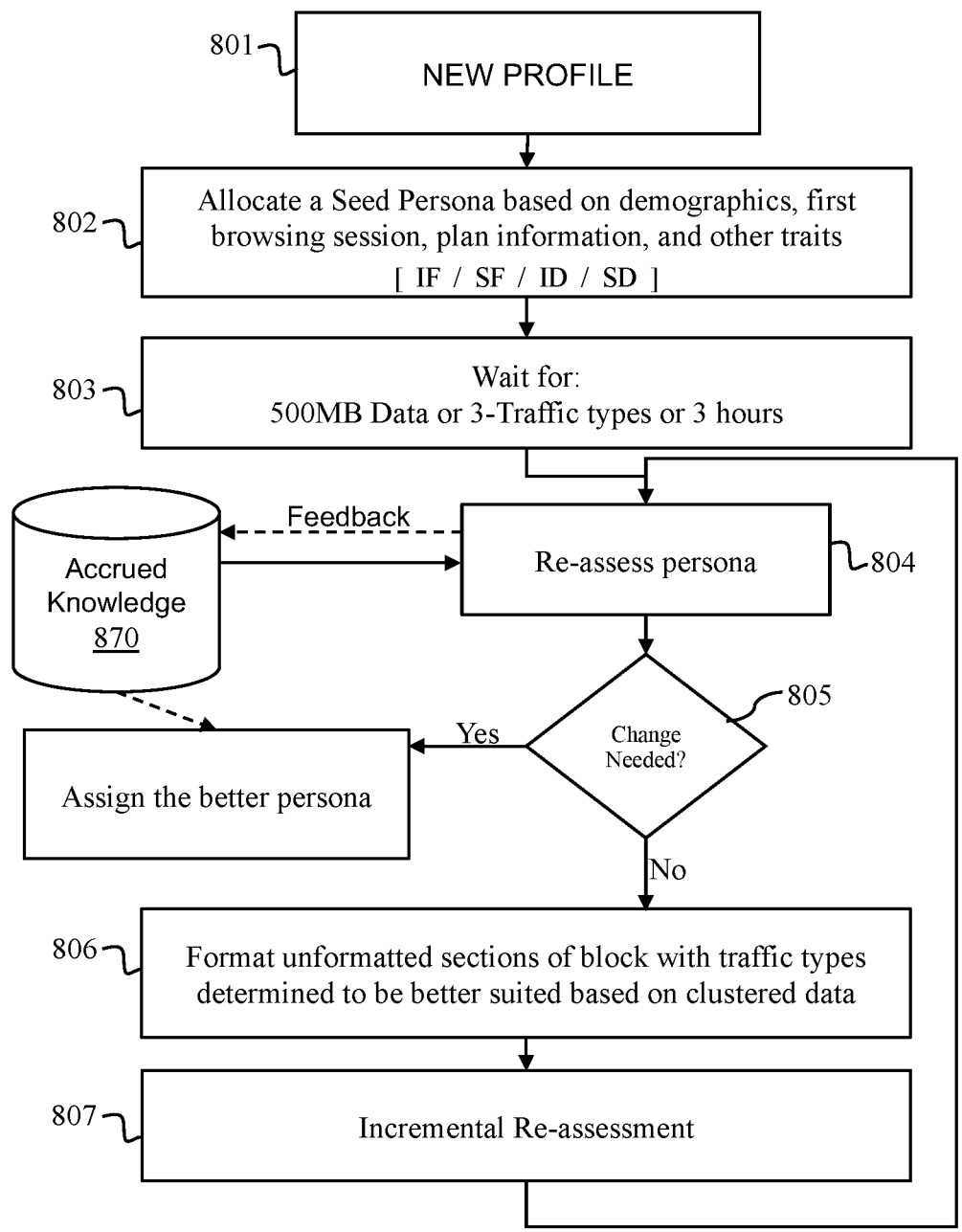
FIG. 8 is a flowchart illustrating a proposed exemplary subscriber profile assessment cycle.

Turning now to FIG. 8, therein illustrated is a flowchart of a proposed exemplary subscriber profile assessment cycle. At new profile step 801, information is received in incoming data stream 401 related to a user within, for instance, a mobile telecommunication network, but for whom the system of the disclosure has not yet proceeded to implement the profile information as herein described. Upon receipt, allocation step 802 is immediately performed and a seed persona or seed blueprint 610 is assigned based on the characteristics of user behavior as described above. In a potentially preferred embodiment of the disclosed system, those may be ID 701, SD 702, IF 703, and SF 704 as described in detail above. Once a seed blueprint 610 has been chosen at allocation step 802, various milestones may be used in order to determine whether to re-assess. Milestone step 803 may occur, for instance, after 500 MB of data has been consumed by the user, the user has transitioned among 3 various traffic-types, or 3 hours has passed. Once milestone step 803 has occurred by achieving one or more of the indicated milestones, reassessment step 804 may occur. Various bases may exist to inform whether re-allocation is needed at reassessment step 804 and may occur based on accrued knowledge 870. After an assessment has occurred at reassessment step 804, then the systems of the disclosure may determine that a change is needed at change step 805. If no changes are needed, unformatted sections which have arrived via incoming data stream 401 related to the user may be formatted based on traffic types that may be determined to be better suited based on clustered data at formatting step 806, and allocated as such. Even in situations where behavior remains constant, resources may be dedicated to re-cycling the user through incremental re-assessment step 807, by simply cycling to reassessment step 804. Additionally, this reassessment step 807 may occur incrementally, for instance, at every 5 GB of data consumption and/or every day. In general, the cycling of persona may be based on fact and/or rule-based decisioning, heuristics-based decisioning, and/or knowledge/learning-based decisioning, as may be known to those having ordinary skill in the art. In order to continuously re-calibrate each subscriber and/or user to stay aligned with an optimal layout, the decisioning itself may be based around receiving and/or implementing the optimal traffic-types around the head of HTD memory unit and/or 541 HOD memory unit 542. Additionally, pre-formatting the optimal expected traffic-types for each user/subscriber based on a hypothetical persona matrix 700 may be important. Finally, achieving the optimal density between HTD memory unit 541 and/or HOD memory unit 542 may achieve further benefits in a system of the disclosure.

Figure 9:
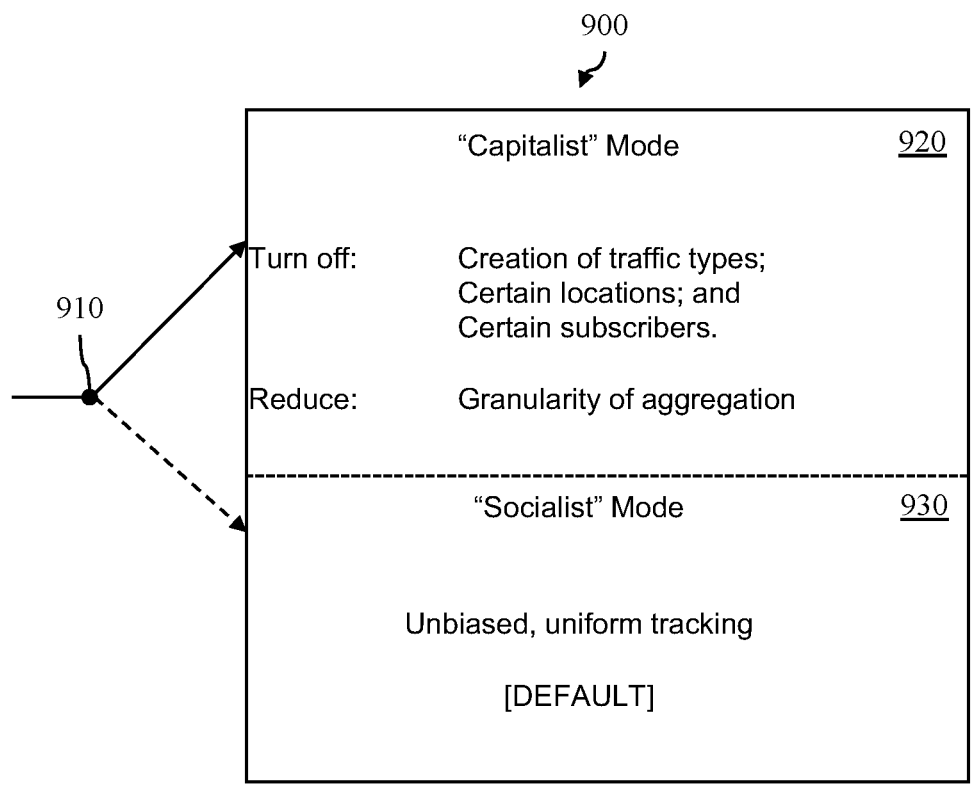
FIG. 9 is a diagram illustrating an exemplary switching process to designate certain modes of operation.

Finally, turning to FIG. 9, therein illustrated and herein described may be a diagram illustrating an exemplary switching process to designate certain modes of operation of the system of the disclosure. For illuminate purposes only, the term Socialist/Capitalist Switch 900 has been coined and therein illustrated. Certain concepts are described herein as a background to the development of such a proposed switch. A system of the disclosure may contain such a Socialist/Capitalist Switch 900 in order to track certain metrics that assist the system of the disclosure assess the effectiveness of tracking certain traffic-types and certain users and/or personas. These may include monthly bills having thousands of records/month per user or subscriber, monthly bills having traffic types tracked, processed record volumes and/or events tripped, number of offers activated, and entropy scores. An entropy score may measure the minimum number of distinct traffic types that consume, for instance 70% of a particular subscriber's usage over a time period or, alternatively, while at a specific location or general region. Subscribers that may exhibit very random-access patterns or user behavior may receive a high entropy value because many traffic types may be need to consume that level of total user consumption (e.g., 70%). If, by default, every user is treated equal and all traffic types are also treated equal, Socialist mode 930 may be said to be occurring and/or implemented. In Socialist mode 930, fairness among users and traffic types may occur with unbiased, uniform tracking. From a business outcome perspective, Socialist mode 930 may not be ideal, but resources may not be dedicated specifically to re-assessment, memory rearrangement, etc. Instead, it may be beneficial in some circumstances to target users or subscribers who have a greater propensity to act upon a specific marketing promotion or offer, transmitted directly to the user via the mobile device upon which they consume data. A switch from a potentially preferred default, or Socialist mode 930 may occur to transition or switch into Capitalist mode 920. This may occur automatically when metrics fall or rise to a certain threshold. Capitalist mode 920 may be thought of by those having ordinary skill in the art as a focus on return on investment (ROI) and can assist in reducing waste on computing resources by selectively targeting only a subset of subscribers likely to act upon an offer or promotion and do so with fewer resources and at a faster response time.

Putting these disclosed concepts, machines, systems, methods, and other features of the disclosure into practice may further assist those having ordinary skill in the art in implementing such a system and method upon large datasets. Essentially, a real-time streaming aggregation and event check framework may be developed using these disclosed concepts, machines, systems, methods, and other features of the disclosure. By implementing such concepts, machines, systems, methods, and other features of the disclosure on a zero-message queue (ZMQ or OMQ) asynchronous messaging platform and using facilities consumption of telecommunications grade deep packet inspection data at real time and by aggregating them on-the-fly, many benefits may be observable to those having ordinary skill in the art. By consuming DPI data over industry-standard messaging frameworks at input incoming data stream 401, performing traffic categorization based on pre-configured data-classification rules, and aggregating them on-the-fly to different levels of granularity, such as 1 minute (m), 2 m, 5 m, 10 m, 30 m, and 60 m, across different traffic types, such as streaming, social media, gaming, as varying degrees of granularity may be valuable depending on traffic type. Additionally, redundancy in marketing or other offers may be achieved in order to avoid subscribers being bothered with inapplicable offers. For example, someone without any social media activity would not be contacted with such offers, and may only receive those related to gaming, if such behavior and/or persona is relevant to such a subscriber. This may support real time monitoring of IP traffic by type to assist in reaching out to audience(s) consuming specific data and/or content and meeting certain additional criterion. This may also be thought of by those having ordinary skill in the art as a holistic data analysis and monitoring system that consumes DPI data by parsing and translating into internal 86-digit numbers, then, labelling such traffic using mapping rules and weights that allow unambiguous traffic-type determination, accumulating such real-time information into efficiently laid out HTD memory unit 541 and/or HOD memory unit 542 and the counter IDs thereon, performing composite event checks using single modulo operation(s) and then passing over to other business modules which may be capable of directly soliciting subscribers for campaign management systems, and in potentially preferred embodiments, generating real-time offers that are highly relevant to individual subscribers' or subscriber groups' contextual behavior, and finally communicating the same to either the business and/or the subscriber.

In other aspects, the disclosed system and method for efficient numerical data model, memory management and streaming aggregation cumulative event check in large semi-structured datasets may model the incoming data stream 401 as a large hexadecimal number thus facilitating simple math/arithmetic on related fields of the records realized using numerical operations on groups of digits of the modelled number. By assigning such weights to categories of labelled traffic using prime numbers and subcategories using square free numbers, users of the disclosed system may be empowered to easily determine the lineage of any individual counter ID unambiguously from a plurality of counter ID number(s) using basic rules of divisibility. By organizing accumulated traffic statistics into an efficient in memory layout formed using HOD memory unit(s) 542 and HTD memory unit(s) 541 having stored thereon counter IDs with embedded free-space tracking and memory management, further benefits may be achieved. The layout(s) of counter IDs stored upon HOD memory unit(s) 542 may allow, enable, or make simple the tracking of any 3 factors of 60 minutes cohesively in a single counter with 3 bins each having 3 cells. By assimilating behavioral profiles for subscribers realized using multiplication of constituent counter face values or weights, compact encoding may be achieved and may make concrete abstract behavior into numbers, which can in turn rely on numerical methods, such as divisibility and the like, in order to return to a business unit and/or approach directly using a connected system the subscribers relevant to a specific business-desired promotion/offer. Thus, even otherwise hidden behavioral traits may be observed simply by analyzing powers of prime factors of counter IDs at any particular point in time as well as the change in patterns over time.

Having implemented the disclosed methods upon a system according to the disclosure, many benefits have been achieved that may be notable to those having ordinary skill in the art. First, a highly efficient and fast data organization using custom and/or proprietary formatting techniques for coding and memory management has been enabled across many business-user CRM systems. Fast aggregation using 2 second complement addition for incoming data stream 401 has been achieved for efficient messaging and reduced end-to-end response times with highly efficient memory management logic. In one such implementation, 63 billion incoming data stream 401 records have been processed daily at an average speed of more than 800,000 records per second. Real time traffic has been aggregated into more than 30 traffic-types to assist telecommunication companies with direct solicitation of marketing offers to subscribers, with highly-relevant offers prior to the completion of a given browsing session. Parsing cumulative labelling speeds of more than 300,000 records per second per core have been achieved having aggregation cumulative event trip speeds of 60,000 records per second per core on an INTEL® XEON® 2.5 GHz core system. As a result, processing speeds of 750,000 records per second may be sustained to process over 60 billion streaming records using only 2 units of INTEL® XEON® ES-2690 at 2.70 GHz with 8 cores and 256 GB RAM.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A method for aggregating an incoming data stream containing a telecommunication subscriber activity data at a computing device having a processor, a non-transitory computer readable medium, and a memory, the computing device capable of a deep packet inspection (DPI) during consumption by the computing device, the computing device further configured with a zero message queue (ZMQ) platform installed thereon, the method comprising the steps of:
    establishing the incoming data stream to said computing device, said incoming data stream comprising a plurality of subscriber consumption data;
    continuously performing the DPI upon said incoming data stream via the ZMQ platform for each of said plurality of subscriber consumption data and outputting a DPI data;
    parsing said DPI data on a per-subscriber basis;
    translating said DPI data parsed on said per-subscriber basis into a plurality of 86-digit numbers, a unique 86-digit number for each of said plurality of subscriber consumption data;
    assigning a plurality of labels to each of said plurality of 86-digit numbers, said plurality of labels obtained from a group of mapping rules;
    assigning a plurality of weights to each of said plurality of 86-digit numbers;
    accumulating said plurality of 86-digit numbers, said plurality of labels, and said plurality of weights onto the memory; and
    performing composite event checks upon said plurality of 86-digit numbers and said plurality of labels using a single modulo operation.

2. The method of claim 1, wherein each of said plurality of 86-digit numbers are assigned from a plurality of hexadecimal numbers.

3. The method of claim 2, wherein each of said plurality of weights are chosen from a plurality of prime numbers.

4. The method of claim 3, wherein said group of mapping rules consists of a mapping rule for each of a plurality of traffic types.

5. The method of claim 4, wherein said plurality of traffic types are selected from video streaming, social media, web browsing and gaming.

6. The method of claim 1, further comprising performing traffic categorization upon said incoming data stream based on data classification rules.

7. The method of claim 1, further comprising aggregating at least a portion of each of said plurality of 86-digit numbers from a master set of 12 grains, said master set of 12 grains are each of a plurality of factors of 60.

8. The method of claim 7, wherein said plurality of factors of 60 are 1, 2, 3, 4, 5, 6, 10, 12, 15, 20, 30, and 60.

9. The method of claim 2, wherein each of said plurality of 86-digit numbers contains a 3-byte leading counter ID.

10. The method of claim 9, wherein each of said plurality of 86-digit numbers contains a 2-byte timestamp.

11. A computer system for aggregating an incoming data stream of a telecommunication subscriber activity data, the computer system comprising:
    a memory device for storing a plurality of data from the incoming data stream;
    a non-transitory computer readable medium having a zero message queue (ZMQ) platform installed thereon;
    a network connection capable of receiving the incoming data stream; and
    a processor in communication with said memory device, said non-transitory computer readable medium, and said network connection, said processor configured to perform a deep packet inspection (DPI) further configured to:
    continuously perform said DPI upon said incoming data stream via the ZMQ platform for each of said plurality of subscriber consumption data and output a DPI data;
    parse said DPI data on a per-subscriber basis;
    translate said DPI data parsed on said per-subscriber basis into a plurality of 86-digit numbers, a unique 86-digit number for each of said plurality of subscriber consumption data;
    assign a plurality of labels to each of said plurality of 86-digit numbers, said plurality of labels obtained from a group of mapping rules;
    assign a plurality of weights to each of said plurality of 86-digit numbers;
    accumulate said plurality of 86-digit numbers, said plurality of labels, and said plurality of weights onto the memory device; and
    perform composite event checks upon said plurality of 86-digit numbers and said plurality of labels using a single modulo operation.

12. The system of claim 11, wherein each of said plurality of 86-digit numbers are assigned from a plurality of hexadecimal numbers.

13. The system of claim 12, wherein each of said plurality of weights are chosen from a plurality of prime numbers.

14. The system of claim 13, wherein said group of mapping rules consists of a mapping rule for each of a plurality of traffic types.

15. The system of claim 14, wherein said plurality of traffic types are selected from video streaming, social media, web browsing and gaming.

16. The system of claim 11, wherein said processor in communication with said memory device, said non-transitory computer readable medium, and said network connection, said processor is further configured to perform traffic categorization upon said incoming data stream based on data classification rules.

17. The system of claim 11, wherein said processor in communication with said memory device, said non-transitory computer readable medium, and said network connection, said processor is further configured to aggregate at least a portion of each of said plurality of 86-digit numbers from a master set of 12 grains, said master set of 12 grains are each of a plurality of factors of 60.

18. The system of claim 17, wherein said plurality of factors of 60 are 1, 2, 3, 4, 5, 6, 10, 12, 15, 20, 30, and 60.

19. The system of claim 12, wherein each of said plurality of 86-digit numbers contains a 3-byte leading counter ID.

20. The system of claim 19, wherein each of said plurality of 86-digit numbers contains a 2-byte timestamp.

* * * * *